United States Patent Office 3,489,761
Patented Jan. 13, 1970

---

3,489,761
CERTAIN N-(o-NITROPHENYL AND o-NITRO-PYRIDYL)TRIAZOLES
James C. Kauer, Wilmington, Del., assignor to E. I. du Pont de Nemours and Company, Wilmington, Del., a corporation of Delaware
No Drawing. Filed Mar. 6, 1967, Ser. No. 620,666
Int. Cl. C07d 55/06; A61k 27/00
U.S. Cl. 260—296
4 Claims

ABSTRACT OF THE DISCLOSURE

Novel N-(o-nitrophenyl- or o-nitropyridyl)triazoles useful as oral antifertility agents for male rats.

FIELD OF THE INVENTION

This invention relates to novel N-(o-nitroaromatic)triazoles.

DETAILS OF THE INVENTION

Although many derivatives of heterocyclic compounds have been made and used in antifungal or similar biological applications, it has now been found that selected new heterocycles have utility as male antifertility agents.

The compounds of the invention have the formula:

(I) 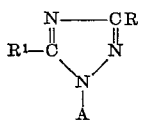

wherein
R and $R^1$, alike or different, are selected from the group consisting of hydrogen, halogen and lower alkyl, carbacyl having up to 5 carbon atoms and benzoyl, and aryl, aralkyl, alkaryl and haloaryl having up to 7 carbons; and
A is o-nitrophenyl or o-nitropyridyl or a monohalo substitution product of o-nitrophenyl or o-nitropyridyl. The compounds where one or both of R and $R^1$ are hydrogen are preferred.

The compounds can be made by arylation of a 1,2,4 triazole having hydrogen on nuclear nitrogen with an ortho-nitrohalobenzene or a pyridine having nitro and halo groups on adjacent carbons according to the equations:

(1) 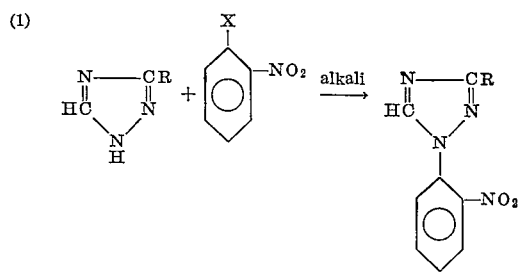

(2) 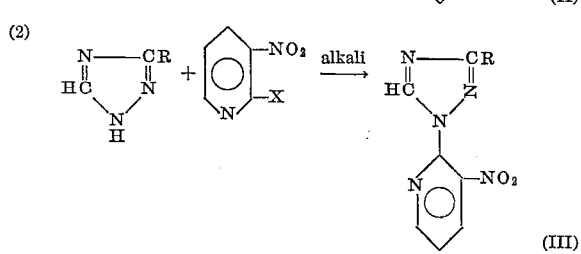

In reaction (2), isomerization (tautomerization) of the initial triazole to the corresponding 1H-1,3,4-triazole (alternatively named as 4H-1,2,4-triazole) gives some of the corresponding 1-(3′-nitro-2′-pyridyl)-1,3,4-triazole.

The above-defined products are new. Although in some instances closely related analogs and even isomers have been previously obtained, the new compounds differ from these prior compounds in the presence of a mono-nitro group in the ortho position of the 6-membered aromatic ring coupled with the bonding of the aromatic ring to nuclear nitrogen of the 5-membered heterocyclic portion. The heterocycle has conjugated unsaturation and 3 nitrogen atoms in the ring.

A peculiar and unexpected property of the new compounds of this invention as compared to previously obtained nitroaryl-substituted heterocycles of this general class is that they inhibit sperm production in the male rat without inhibition of male sex characterstics. For example, three weeks after a single dose the character of the sperm-producing and maturing tubules of a male rat is altered without altering the androgen production by the tests as determined by the appearance of the ventral prostate and seminal vesicles. Thus the specific effect as a male anti-fertility agent in male rats does not inhibit endocrine function with undesirable hormonal side effects as are customarily obtained when steroidal compounds are administered.

EMBODIMENTS OF THE INVENTION

The following examples further illustrate the new compounds of this invention and their preparation. In the examples, temperatures are given in degrees centigrade and pressures are atmospheric.

In the examples, isomer mixtures are produced in some instances. The individual compounds can be separated by conventional means, includjng distillation, recrystallization or chromatography.

EXAMPLE 1

1-(o-nitrophenyl-1,2,4-triazole R and $R^1$=H and A=o-nitrophenyl)

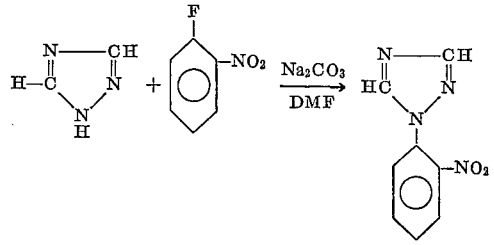

A mixture of 6.9 g. of 1,2,4-triazole, 14.1 g. of o-fluoronitrobenzene, 45 ml. of N,N-dimethylformamide and 10.6 g. of sodium carbonate was stirred and heated at reflux overnight. The product was poured on ice, and the tan crystalline product was separated by filtration. The damp solid was recrystallized from 100 ml. of hot ethanol. The resulting light yellow crystals weighed 13.3 g. after washing with cold ethanol and ether. Recrystallization from benzene yielded colorless platelets melting at 113–114°, $$\lambda_{max.}^{EtOH} = 218 \, m\mu (\epsilon = 14{,}800)$$

*Analysis.*—Calcd. for $C_8H_6N_4O_2$: C, 50.53; H, 3.18; N, 29.47. Found: C, 51.17, 51.24; H, 3.42, 3.31; N, 29.53.

The compound exhibited infrared absorption peaks at 3110, 1620, 1600, 1545, 1505, 1428, 1363, 1308, 1280, 1225, 1148, 1102, 1060, 1034, 1000, 992, 955, 913, 900, 852, 784, 750, 714, 707 and 678 cm.$^{-1}$.

In place of 1,2,4-triazole in the preceding Example 1, the following substituted triazoles can be used to give new triazoles as shown by the following:

TABLE I

| Triazole | o-Nitrophenyl derivative |
|---|---|
| 3-methyl-1,2,4-triazole | 1-(o-nitrophenyl)-3(and 5)-methyl-1,2,4-triazole. |
| 3-phenyl-1,2,4-triazole | 1-(o-nitrophenyl)-3(and 5)-phenyl-1,2,4-triazole. |
| 3-(p-chlorophenyl)-1,2,4-triazole | 1-(o-nitrophenyl)-3(and 5)-(p-chlorophenyl)-1,2,4-triazole. |
| 3-ethyl-1,2,4-triazole | 1-(o-nitrophenyl)-3(and 5)-ethyl-1,2,4-triazole. |
| 3-benzyl-1,2,4-triazole | 1-(o-nitrophenyl)-3(and 5)-benzyl-1,2,4-triazole. |
| 3-bromo-1,2,4-triazole | 1-(o-nitrophenyl)-3(and 5)-bromo-1,2,4-trizaole. |
| 3-chloro-1,2,4-triazole | 1-(o-nitrophenyl)-3(and 5)-chloro-1,2,4-triazole. |
| 3-propionyl-1,2,4-triazole | 1-(o-nitrophenyl)-3(and 5)-propionyl-1,2,4-triazole. |
| 3-pivaloyl-1,2,4-triazole | 1-(o-nitrophenyl)-3(and 5)-pivaloyl-1,2,4-triazole. |

4-(o-nitrophenyl)-4H-1,2,4-triazole can be prepared by nitration of the 4-phenyl 4H-1,2,4-triazole and separation of the desired isomer by standard methods.

EXAMPLE 2

1-(o-nitro-p-chlorophenyl)-1,2,4-triazole (R and $R^1$=H and A=o-nitro-p-chlorophenyl)

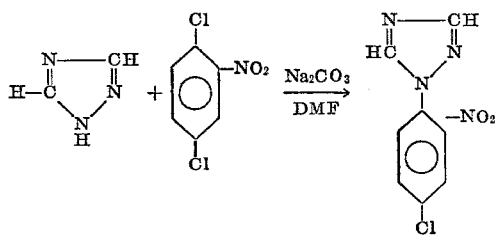

A mixture of 19.2 g. of 1,4-dichloro-2-nitrobenzene, 6.9 g. of 1,2,4-triazole, 12 g. of sodium carbonate and 50 ml. of N,N-dimethylformamide was stirred and heated to 160° overnight. The product was poured on ice, and the resulting solid (15.4 g.) was separated by filtration and washed with water. After successive recrystallization from chloroform and from ethanol, the 1-(o-nitro-p-chlorophenyl)-1,2,4-triazole melted at 139–140° and had $\lambda^{EtOH}_{max.}$ 298($\epsilon$=1760), 224(19,700)

*Analysis.*—Calcd. for $C_8H_5ClN_4O_2$: C, 42.78; H, 2.25; N, 24.95. Found: C, 42.47; H, 2.01; N, 24.51.

EXAMPLE 3

1-(3'-nitro-2'-pyridyl)-1,2,4-triazole (R and R'—H and A=3'-nitro-2'-pyridyl)

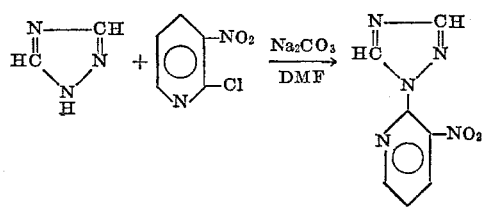

A solution of 15.9 g. of 2-chloro-3-nitropyridine and 6.9 g. of 1,2,4-triazole in 50 ml. of N,N-dimethylformamide was stirred with 12 g. of anhydrous sodium carbonate and heated to 85° for 2 hours. The resulting mixture was poured on ice, and the solid (15.3 g.) was separated by filtration and washed with water. After successive recrystallization from hexane and from benzene, the 1-(3'-nitro-2'-pyridyl)-1,2,4-triazole melted at 136.8–138°.

*Analysis.*—Calcd. for $C_7H_5N_5O_2$: C, 43.98; H, 2.64; N, 36.64. Found: C, 43.95; H, 2.71; N, 36.90.

When the 6-member aromatic ring is pyridyl instead of benzenoid, isomers and halogenated products are produced as shown in Table II.

TABLE II

| Compound | Source |
|---|---|
| 1-(3'-nitro-4'-pyridyl)-1,2,4-triazole | 4-chloro-3-nitropyridine and 1,2,4-triazole. |
| 1(4'-nitro-3'-pyridyl)-1,2,4-triazole | 3-chloro-4-nitropyridine and 1,2,4-triazole. |

For biological activity as described in this invention, at least one nuclear carbon of the 5-membered heterocyclic moiety should be unsubstituted, i.e., should carry hydrogen, and the 6-membered aromatic, i.e., benzenoid or pyridyl, should have no more than one substituent in addition to the o-nitro group.

As noted above, the compounds of this invention are, surprisingly, good antifertility agents for male rats. The compound of the examples were tested for anti-testis activity by giving intact adult male rats a single oral dose of compound suspended in aqueous vehicle in a volume of 1.0 ml. per 100 g. of body weight. Control rats received vehicle only. Three weeks after treatment the rats were weighed and necropsied. The epididymides, testes, ventral prostate and sometimes the seminal vesicles were examined for evidence of gross changes.

Testis weight decrease and/or gross changes in the seminiferous tubules or epididymal ducts indicate an anti-fertility effect. From experience, it is believed that a testis weight decrease of 50% indicates maximal activity.) Decrease in size of ventral prostate and seminal vesicles indicates a decrease in androgen production by the non-seminiferous portion of the testis. An ideal male anti-fertility agent would inhibit sperm production or maturation only, without any effect on testis androgen production.

The compounds of this invention caused a dose-related decrease in testis weight compared to the testes of control rats. There were gross changes in the seminiferous tubules and epididymal ducts, but no changes were observed in the ventral prostate and seminal vesicles. Specific information is given in the following Table III, the first three compounds of which are included in the scope of the present invention but the last (inactive or undesirable) two of which are not:

TABLE III.—ANTI-TESTIS ACTIVITY OF COMPOUNDS OF THIS INVENTION VERSUS OTHER SELECTED COMPOUNDS

| Compound | Example | Dose, mg./kg. | Percent decrease in testis weight | Change [1] in Epididymal ducts | Change [1] in Ventral prostate |
|---|---|---|---|---|---|
| 1-(o-Nitrophenyl)-1,2,4-triazole | 1 | 100 | 42 | 2.0 | 0.0 |
| 1-(o-Nitro-p-chlorophenyl)-1,2,4-triazole | 2 | 150 | 50 | 2.0 | 0.0 |
| 1-(3'-nitro-2'-pyridyl)-1,2,4-triazole | 3 | 150 | 49 | 1.8 | 0.0 |
| 1-(o-Nitrophenyl)-1,2,3-triazole | | 50 | 5 | 0.33 | 0.0 |
| | | 150-All rats died. | | | |
| 1-(p-Nitrophenyl)-1,2,4-triazole | | 150 | 3 | 0.0 | 0.0 |

[1] On a rating scale of 2.0=grossly abnormal, 1.0=somewhat abnormal, 0.0=normal.

In addition to the use of the compounds as anti-fertility agents for control of animal populations, e.g., rodents, they can be employed as pre-emergence herbicides. For example, at an application rate of 16 pounds per acre the compounds of the preceding examples exhibit toxicity to plants, particularly to mustard and marigold. The compounds of the examples have also been found to inhibit the feeding of army worms when applied to their foodstuffs at up to about a 1% concentration.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the formula

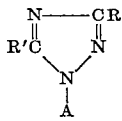

wherein
R and R', alike or different, are selected from the group consisting of hydrogen, halogen and lower alkyl, carbacyl having up to 5 carbon atoms and benzoyl and aryl, aralkyl, alkaryl and haloaryl having up to 7 carbons; and A is o-nitrophenyl or o-nitropyridyl or a monohalo substitution product of o-nitrophenyl or o-nitropyridyl.

2. The compound of claim 1 wherein R and R' are each hydrogen and A is o-nitrophenyl, 1-(o-nitrophenyl)-1,2,4-triazole.

3. The compound of claim 1 wherein R and R' are each hydrogen and A is o-nitro-p-chlorophenyl, 1-(o-nitro-p-chlorophenyl)-1,2,4-triazole.

4. The compound of claim 1 wherein R and R' are each hydrogen and A is 3'-nitro-2'-pyridyl, 1-(3'-nitro-2'-pyridyl)-1,2,4-triazole.

References Cited

UNITED STATES PATENTS 2,800,486   7/1957   Grundmann et al. ____ 260—308

OTHER REFERENCES

Ainsworth et al., Journal of Medicinal and Pharmaceutical Chemistry, vol. 5 pp. 383–89 (1962), RS 1 J 5.

HENRY R. JILES, Primary Examiner

A. L. ROTMAN, Assistant Examiner

U.S. Cl. X.R.

260—46.5, 315, 332.3, 335, 346.1, 999